United States Patent
Dunjic et al.

(10) Patent No.: US 12,316,645 B2
(45) Date of Patent: May 27, 2025

(54) SYSTEM AND METHODS FOR SECURE PROCESSING OF REAL-TIME RESOURCE TRANSFERS

(71) Applicant: The Toronto-Dominion Bank, Toronto (CA)

(72) Inventors: Milos Dunjic, Oakville (CA); David Samuel Tax, Toronto (CA); Jonathan Joseph Prendergast, West Chester, PA (US); Kushank Rastogi, Toronto (CA); Vipul Kishore Lalka, Oakville (CA); Asad Joheb, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 792 days.

(21) Appl. No.: 17/388,316

(22) Filed: Jul. 29, 2021

(65) Prior Publication Data

US 2023/0029815 A1    Feb. 2, 2023

(51) Int. Cl.
    *H04L 29/06*    (2006.01)
    *H04L 9/32*    (2006.01)
    *H04L 9/40*    (2022.01)

(52) U.S. Cl.
    CPC .......... *H04L 63/126* (2013.01); *H04L 9/3247* (2013.01)

(58) Field of Classification Search
    None
    See application file for complete search history.

(56) References Cited

U.S. PATENT DOCUMENTS 8,868,467 B2    10/2014   Serebrennikov
9,159,058 B2    10/2015   Fleishman et al.
(Continued)

OTHER PUBLICATIONS

Mohamed Al-Fairuz, Karen Renaud; Multi-channel, Multi-level Authentication for More Secure eBanking; Published in Conference: Information Security South Africa Conference 2010, Sandton Convention Centre, Sandton, South Africa, Aug. 2-4, 2010. Proceedings ISSA 2010; https://citeseerx.ist.psu.edu/viewdoc/download?doi=10.1.1.463.5133&rep=rep1&type=pdf; Jan. 2010.

*Primary Examiner* — Daniel B Potratz
*Assistant Examiner* — Mayasa A. Shaawat
(74) *Attorney, Agent, or Firm* — Rowand LLP

(57) ABSTRACT

A computer-implemented method is disclosed. The method includes: receiving a first request to initiate a first resource transfer for transferring a first defined quantity of resources from a transferor data record to a transferee data record; determining that the first resource transfer is of a first type; in response to determining that the first resource transfer is of a first type, performing verification of the transferee data record by: transmitting, to a first server associated with the transferee data record, a second request to initiate a second resource transfer for transferring a second defined quantity of resources from the transferee data record to the transferor data record; receiving, from the first server, a response message associated with the second request, the response message authorizing the second resource transfer; and verifying the transferee data record based on the response message, and after verifying the transferee data record, initiating a third resource transfer for transferring a third defined quantity from the transferor data record to the transferee data record.

20 Claims, 6 Drawing Sheets

(56) References Cited

U.S. PATENT DOCUMENTS

| | | |
|---|---|---|
| 10,693,658 B2 * | 6/2020 | Jacobs .................. H04L 9/3236 |
| 2011/0055083 A1 | 3/2011 | Grinhute |
| 2011/0137789 A1 | 6/2011 | Kortina et al. |
| 2013/0159194 A1 | 6/2013 | Habib |
| 2013/0282580 A1 | 10/2013 | O'Brien et al. |
| 2015/0348038 A1 | 12/2015 | Femrite et al. |
| 2017/0141926 A1 * | 5/2017 | Xu ........................ H04L 9/3066 |
| 2017/0221066 A1 | 8/2017 | Ledford et al. |
| 2019/0098013 A1 * | 3/2019 | Wilkinson ............ H04L 9/0825 |
| 2020/0387878 A1 * | 12/2020 | Jones ...................... G06F 21/31 |
| 2021/0049596 A1 * | 2/2021 | Guo ...................... H04L 9/3247 |

\* cited by examiner

SYSTEM AND METHODS FOR SECURE PROCESSING OF REAL-TIME RESOURCE TRANSFERS

TECHNICAL FIELD

The present application relates to data security and, more particularly, to systems and methods for securely processing real-time transfers of resources in a networked environment.

BACKGROUND

In a computer network, resources may be shared or transferred between nodes of the network. For example, computing resources, such as processing units, memory, etc., may be transferred between nodes in order to attain a desired distribution of resources for a computer network. As another example, electronic transfers of data between data records may effect changes to the quantum of resources associated with the data records.

Requests for transfer of resources may be directed to a computing system that processes and handles such requests. By way of example, a server computer that manages a plurality of resource accounts may handle requests to share, distribute, or otherwise transfer resources that are associated with the accounts. For these systems, processing requests for real-time (or substantially in real-time) transfer of resources may pose a number of challenges. Any errors or delays which may be introduced in processing of requests for real-time transfers can cause subsequent processes and actions by the intended transferees of the transfers to be delayed or to fail entirely. Additionally, the speed at which such transfers are conducted may increase the risk of errors and/or security attacks. For example, real-time transfers may not be subjected to comprehensive security checks for verifying the identity of transferees of the transfers. In the absence of proper security measures, the resources that are transferred may be exposed to access attacks by unauthorized parties.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
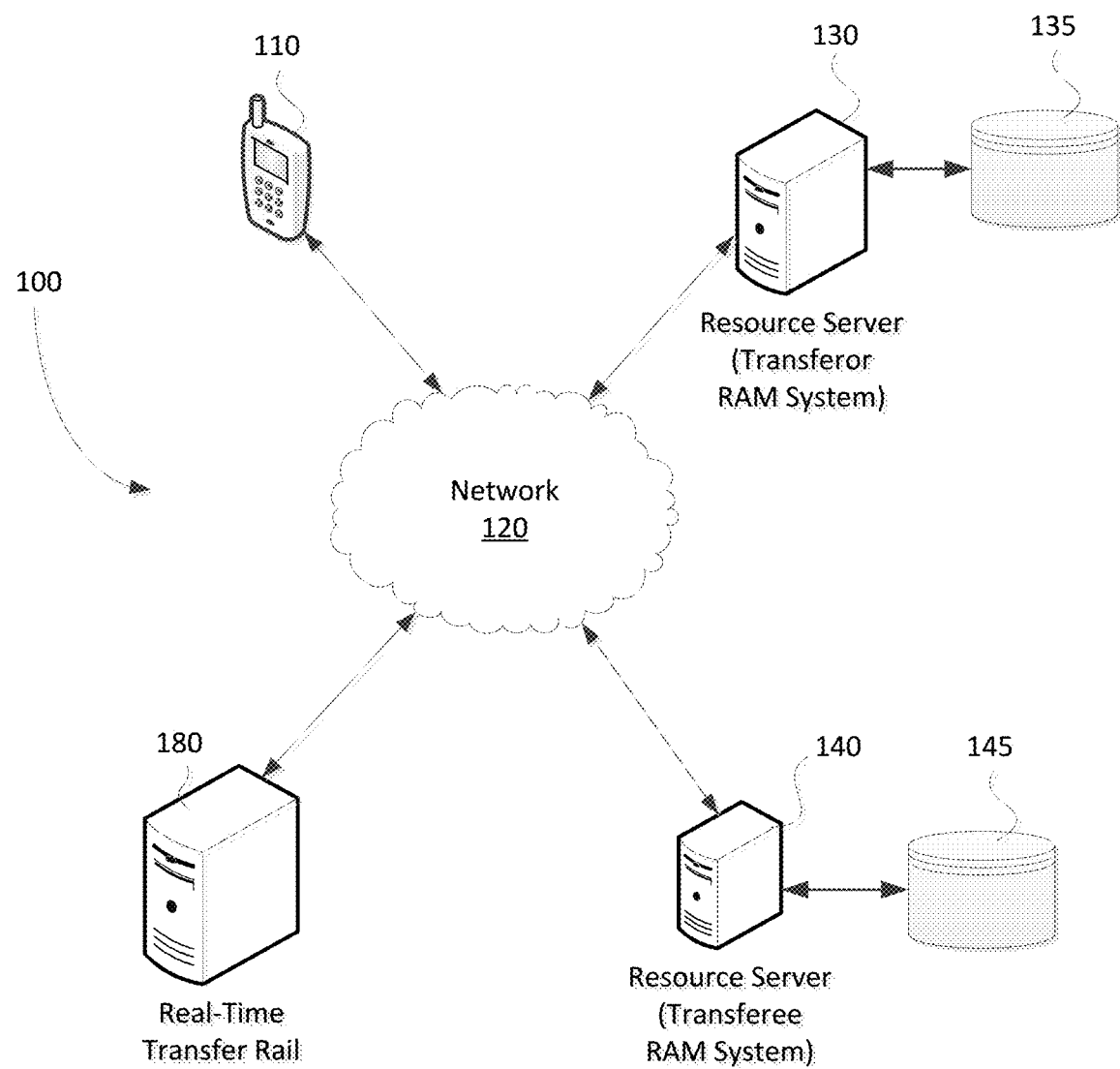
FIG. 1 is a schematic diagram illustrating an operating environment of an example embodiment.

In an aspect, the present disclosure describes a computing device. The computing device includes a processor, a communications module coupled to the processor, and a memory coupled to the processor. The memory stores instructions that, when executed, configure the processor to: receive a first request to initiate a first resource transfer for transferring a first defined quantity of resources from a transferor data record to a transferee data record; determine that the first resource transfer is of a first type; in response to determining that the first resource transfer is of a first type, perform verification of the transferee data record by: transmitting, to a first server associated with the transferee data record, a second request to initiate a second resource transfer for transferring a second defined quantity of resources from the transferee data record to the transferor data record; receiving, from the first server, a response message associated with the second request, the response message authorizing the second resource transfer; and verifying the transferee data record based on the response message, and after verifying the transferee data record, initiate a third resource transfer for transferring a third defined quantity from the transferor data record to the transferee data record.

In some implementations, determining that the first resource transfer is of a first type may include determining that there have not been any previous resource transfers from the transferor data record to the transferee data record.

In some implementations, determining that the first resource transfer is of a first type may include determining that the first defined quantity of resources is requested to be transferred in real-time or substantially in real-time.

In some implementations, request data of the second request may include an indication that the second request is for verifying the transferee data record.

In some implementations, the message data of the response message may include ownership certifying data associated with the transferee data record and verifying the transferee data record based on the response message may include validating the ownership certifying data.

In some implementations, the ownership certifying data may include at least one of: an account identifier associated with the transferee data record; a nonce challenge included in the second request; an indication of the first defined quantity or the second defined quantity; or an indication of historical activity data associated with the transferee data record.

In some implementations, the instructions, when executed, may further configure the processor to generate a first code and verifying the transferee data record based on the response message may include confirming that the first code is included in the message data of the response message.

In some implementations, validating the ownership certifying data may include: obtaining transferee information associated with an intended transferee of the first resource transfer; and performing comparison between the ownership certifying data and the transferee information.

In some implementations, the third defined quantity may be equal to a sum of the first defined quantity and the second defined quantity.

In some implementations, message data of the request message may be digitally signed using a private key associated with the first server.

In another aspect, the present disclosure describes a computer-implemented method. The method includes: receiving a first request to initiate a first resource transfer for transferring a first defined quantity of resources from a transferor data record to a transferee data record; determining that the first resource transfer is of a first type; in response to determining that the first resource transfer is of a first type, performing verification of the transferee data record by: transmitting, to a first server associated with the transferee data record, a second request to initiate a second resource transfer for transferring a second defined quantity of resources from the transferee data record to the transferor data record; receiving, from the first server, a response message associated with the second request, the response message authorizing the second resource transfer; and verifying the transferee data record based on the response message, and after verifying the transferee data record, initiating a third resource transfer for transferring a third defined quantity from the transferor data record to the transferee data record.

In yet another aspect, a non-transitory computer readable storage medium is disclosed. The computer readable storage medium contains instructions thereon which, when executed by a processor, configure the processor to: receive a first request to initiate a first resource transfer for transferring a first defined quantity of resources from a transferor data record to a transferee data record; determine that the first resource transfer is of a first type; in response to determining that the first resource transfer is of a first type, perform verification of the transferee data record by: transmitting, to a first server associated with the transferee data record, a second request to initiate a second resource transfer for transferring a second defined quantity of resources from the transferee data record to the transferor data record; receiving, from the first server, a response message associated with the second request, the response message authorizing the second resource transfer; and verifying the transferee data record based on the response message, and after verifying the transferee data record, initiate a third resource transfer for transferring a third defined quantity from the transferor data record to the transferee data record.

Other aspects and features of the present application will be understood by those of ordinary skill in the art from a review of the following description of examples in conjunction with the accompanying figures. Example embodiments of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the terms "transferor" and "transferee" may be used interchangeably with "sender" and "recipient", respectively, in the context of describing transfers of resources.

In the present application, the term "resource transfer request data" refers broadly to data that is included in a request for resources to be transferred from at least one transferor computing system to at least one transferee computing system. A resource transfer request may be generated by a transferor or transferee and may include information such as identity of the transferee, a designated resource account and/or data record associated with the transferee, quantum of resources requested to be transferred, requested time for the transfer, and a unique transfer identifier. The resource transfer request is processed by the transferor (or a computing system associated with a transferor), and the requested transfer may be initiated in accordance with the resource transfer request data.

Various types of resources, such as computing resources (e.g., processing units, memory, file storage), electronic data, etc., may be transferred between computing systems in a networked environment. A "real-time" resource transfer provides instantaneous (or near instant) exchange of resources. The speed at which real-time resource transfers are conducted may increase the risk of errors and/or security attacks. For example, real-time resource transfers may not be subjected to comprehensive security checks that are intended to verify the identity of transferees of the transfers. In the absence of suitable security measures, the resources that are transferred may be exposed to access attacks by unauthorized parties. As a specific example, a transferor may commit an inadvertent error in identifying an intended recipient account/data record when requesting a transfer of resources that are associated with the transferor. Without proper verification of the recipient identity prior to initiating the requested resource transfer, the resources associated with the transferor may be unwittingly and irreversibly transferred to an account/data record that is controlled or otherwise associated with an unintended recipient.

The present application provides techniques for enabling secure transfer of resources in a networked environment. Specifically, the present disclosure describes methods for verifying the identity of intended transferees of real-time resource transfers. By verifying transferee identity, resource management systems can ensure that (1) requests for misdirected resource transfers are rejected, and (2) valid resource transfers to verified recipients are processed. In particular, the techniques described herein are designed to minimize the risk of resource transfers from trusted parties being directed to resource accounts associated with attackers or otherwise unintended recipients.

The disclosed technology represents improvements in security for resource account management systems and, more particularly, improved security of systems for processing real-time transfers of resources between resource accounts. In particular, the present technology represents improvements over prior resource transfer processing systems which relied, in large part, on requirements of imposed delays, or lags, when processing real-time transfers in order to verify the identity of transferees.

In an aspect, the present disclosure provides a method for securely processing real-time resource transfers. A resource account management (RAM) system may implement the disclosed method when processing a resource transfer request that is submitted by an entity associated with one of the managed accounts. Specifically, a RAM system associated with a transferor of a requested resource transfer (or "transferor RAM system") may implement the disclosed methods. Upon receiving a request to transfer resources associated with a transferor, the RAM system determines whether to verify the identity of a recipient indicated by the transferor. If verification is determined to be required, the RAM system performs verification of an account and/or data record belonging to the identified recipient that is designated in the request. In particular, the RAM system transmits an authentication data request to a computing system associated with the identified recipient. In at least some embodiments, the authentication data request may comprise a request to transfer a defined quantity of resources from the identified recipient to the transferor. The RAM system receives a response message to the authentication data request and verifies the account/data record of the identified recipient based on the response message. The initial resource transfer requested by the transferor may be approved and executed only upon successful verification of the recipient information.

FIG. 1 is a schematic diagram illustrating an operating environment of an example embodiment. In particular, FIG. 1 illustrates exemplary components of a system 100 for processing transfers of resources between computing systems. As a specific example, the system 100 may be implemented to facilitate processing and handling of requests to transfer funds (e.g., payment transactions) between resource accounts (or data records associated therewith). More generally, the components of system 100 enable processing of resource transfer requests that are directed to a resource account management system.

As illustrated, the resource servers 130 and 140 (which may also be referred to as resource account management systems) and one or more client devices 110 communicate via the network 120. The client device 110 is a computing device. For example, the client device 110 may be a device of an entity having resources that are associated with one of the resource servers (e.g., resource server 130). The resource servers 130 and 140 may track, manage, and maintain resources, make lending decisions, and/or lend resources for a plurality of clients. The resources may, for example, include computing resources, such as memory or processor cycles. By way of further example, the resources may include stored value, such as fiat currency, which may be represented in one or more databases. For example, as shown in FIG. 1, the resource server 130 may be coupled to a database 135, which may be provided in secure storage. The secure storage may be provided internally within the resource server 130 or externally; the secure storage may, for example, be provided remotely from the resource server 130. In some embodiments, the secure storage may include one or more data centers. The data centers may, for example, store data with bank-grade security.

The resource servers 130 and 140 may each include a resource request processing engine (not shown in FIG. 1). A resource request processing engine may be implemented to automatically process resource transfer requests that are received at a resource server. Specifically, the resource request processing engine may be configured to process requests to transfer resources that are associated with one or more resource accounts managed by the resource server. The resource request processing engine may process resource transfer requests in accordance with defined handling actions. For example, the resource request processing engine may be configured to automatically process resource transfer requests without manual intervention by related entities (e.g., a resource server administrator, clients associated with the resource accounts, etc.) for the resource transfer requests.

The databases 135 and 145 may each include records for a plurality of accounts and at least some of the records may define a quantity of resources associated with an entity. For example, the entity that is associated with the client device 110 may be associated with a resource account having one or more records in the database 135. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance.

The databases 135 and 145 may also store transfer configuration rules data comprising rules for handling resource transfer requests that are directed to the resource servers 130 and 140, respectively. Various transfer configuration rules may be defined for specifying handling actions for automatically processing resource transfer requests to the resource servers 130 and 140. For example, upon receiving a resource transfer request (e.g., from a client device 110, a transfer request issuing server, etc.), the resource server 130 (or 140) may access the database 135 (or 145) to identify transfer configuration rules that are relevant to the resource transfer request and determine one or more suitable handling actions based on the identified rules. Additionally, or alternatively, the transfer configuration rules data may be stored externally of the databases 135 and 145.

The resource servers 130 and 140 may, for example, be financial institution servers and the entity associated with a client device 110 may be a customer of a financial institution operating one of the financial institution servers.

As shown in FIG. 1, the system 100 may include a real-time transfer rail 180. In at least some embodiments, the real-time transfer rail 180 may be a payment rail. For example, the real-time transfer rail 180 may be hosted by a real-time payment system that includes a real-time payment server. The real-time payment system may be associated with a third-party and be configured to receive a resource (e.g., data) transfer request. The resource transfer request may include a request to transfer resources from a first data record to a second data record. The first data record may include a data record associated with a transferor and the second data record may include a data record associated with a recipient. For example, the first data record may be associated with a first financial institution database and the second data record may be associated with a second financial institution database.

The request to transfer resources may be a request to transfer data such as, for example, units of value. The units of value may include a quantity of currency. The transferor may initiate the resource transfer request using, for example, a computing device.

The resource transfer request may be formatted as an ISO2022 message and may include one or more parameters. The ISO2022 format is a data-rich messaging format that provides the real-time transfer rail 180 with a clear and nuanced format of data. The one or more parameters may be included as metadata in the resource transfer request. The parameters may include, for example, resource definition data. The resource definition data defines what is requested to be transferred. By way of example, the resource definition data may define a resource that is stored in or otherwise associated with a data record associated with the transferor. The resource may represent units of value, such as a quantity of a currency.

Responsive to receiving a resource transfer request, the real-time payment system may complete the resource transfer request using the real-time transfer rail 180. Specifically, the real-time payment server may be configured to receive the resource transfer request and to facilitate the resource transfer from the first data record associated with the transferor to the second data record associated with the recipient in real-time. In some embodiments, the resource transfer may be irrevocable; that is, the transferor may not be able to retrieve the transferred resources after the transfer.

The real-time transfer rail 180 is configured to complete resource transfer requests in real-time or substantially in real-time. In at least some embodiments, real-time is defined as being within seconds. Certain factors, such as network traffic, may limit the immediacy of real-time transfers and/or processing of transfer requests.

The client device 110 may be used, for example, to configure a request to transfer resources from a resource account associated with the client device 110. More particularly, the client device 110 may be used to generate requests to transfer resources from a resource account (or data records associated therewith) of an entity operating the client device 110. A resource transfer may, for example, involve a transfer of data between a record in the database 135 associated with an account at the resource server 130 and another record in the database 135 (or in another database, such as the database 145). The data involved in the resource transfer may, for example, be units of value and the records involved in the resource transfer may be adjusted in related or corresponding manners. For example, during a resource transfer, a record associated with the intended recipient (i.e., transferee) of the transfer may be adjusted to reflect an increase in value resulting from the transfer, whereas the record associated with the entity (i.e., transferor) initiating the transfer may be adjusted to reflect a decrease in value which is at least as large as the increase in value applied to the record associated with the transferee.

The client device 110 and the resource servers 130 and 140 may be in geographically disparate locations. Put differently, the client device 110 may be remote from at least one of the resource servers 130 and 140.

The client device 110 and the resource servers 130 and 140 are computing systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the resource servers 130 and 140 may provide both resource transfer processing (e.g., electronic fund transfers) and data holding (e.g., banking) functions. In particular, the resource servers 130 and 140 may each be both a financial institution server and also a payment transaction processing server. The resource servers 130 and 140 may, in some embodiments, be a proxy server, serving as an intermediary for requests for client devices 110 seeking resources from other servers.

Figure 2A:
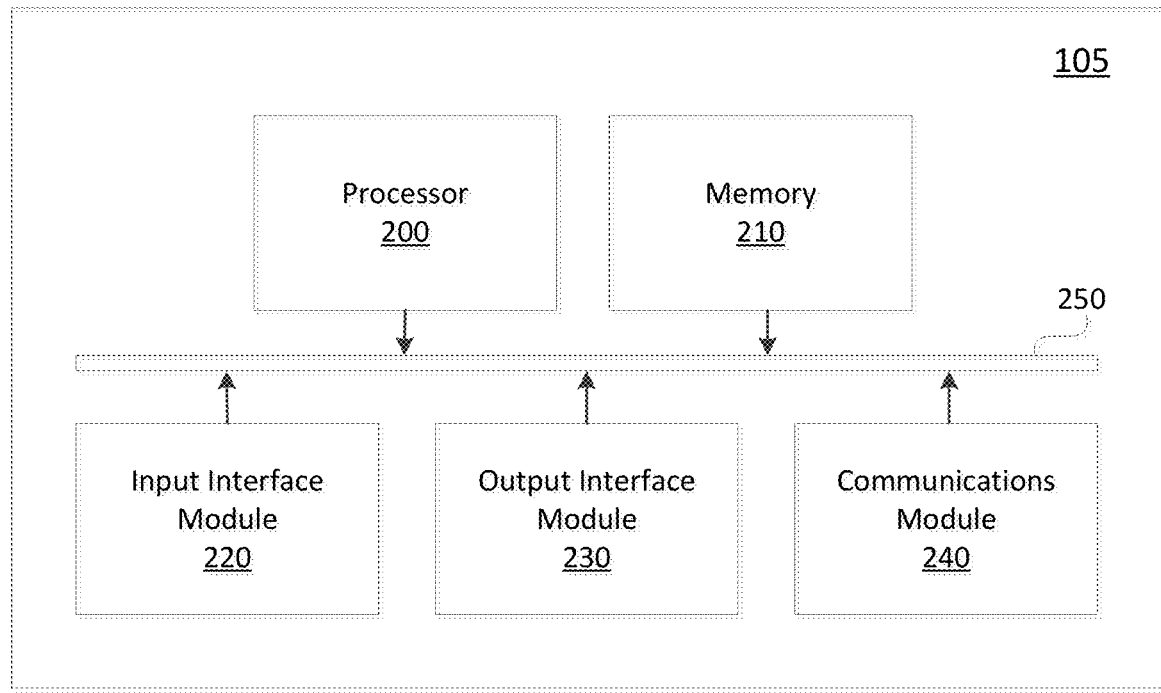
FIG. 2A is high-level schematic diagram of a computing device.

FIG. 2A is a high-level operation diagram of an example computing device 105. In at least some embodiments, the example computing device 105 may be exemplary of one or more of the resource servers 130 and 140 and the client device 110. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
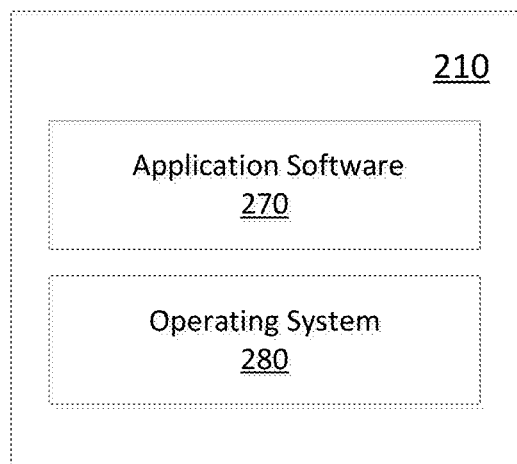
FIG. 2B shows a simplified organization of software components stored in a memory of the computing device of FIG. 2A.

FIG. 2B depicts a simplified organization of software components stored in memory 210 of the example computing device 105. As illustrated, these software components include application software 270 and an operating system 280.

The application software 270 adapts the example computing device 105, in combination with the operating system 280, to operate as a device performing a particular function. In some embodiments, the application software 270 may comprise a resource account management application. The resource account management application may, for example, be a personal banking application that is used to manage one or more banking accounts. The resource account management application may provide various functions such as resource transfers (e.g., electronic fund transfers, etc.), display of account balances, and other account management functions. For example, the resource account management application may enable users to configure requests for transfers of resources to accounts associated with the users. In particular, the resource account management application may be used to generate resource transfer requests. A user may input information, or parameters, for defining a resource transfer request such as the identity of the transferor, quantum of resources requested, and account information for a designated account for receiving the transfer. Once it is defined, the resource transfer request can be transmitted, via the resource account management application, to a computing system for processing resource transfers. For example, the resource transfer request may be transmitted to a resource server managing the account(s) of the requesting entity, and the resource server may subsequently direct the request to a suitable computing system (e.g., resource account management server) that is associated with the identified transferor for the resource transfer.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

Figure 3:
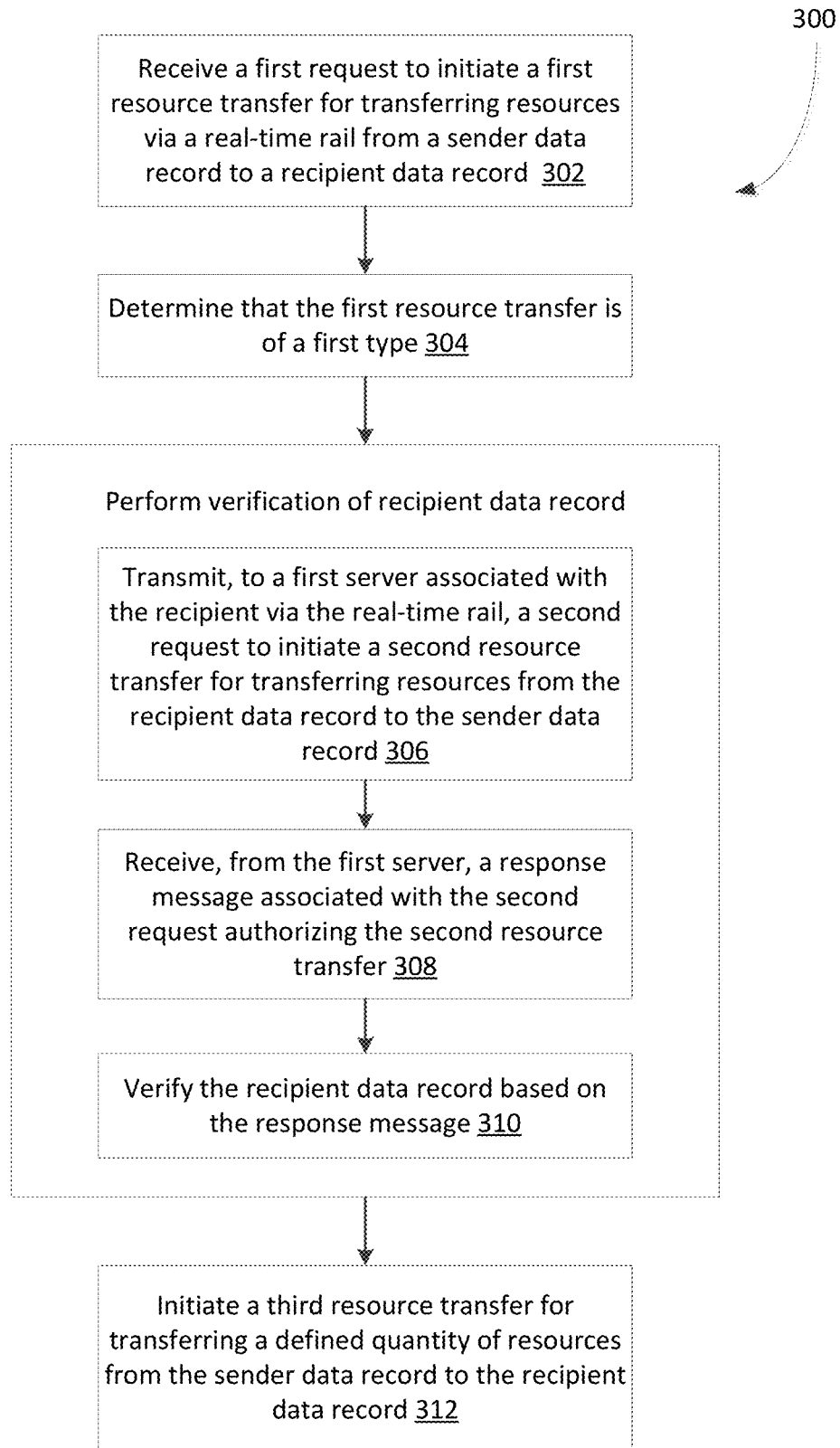
FIG. 3 shows, in flowchart form, an example method of processing a request for a real-time transfer of resources associated with a data record.

Reference is now made to FIG. 3, which shows, in flowchart form, an example method 300 of processing a request for a real-time transfer of resources associated with a data record. The method 300 may be implemented by a resource management system, such as the resource server 130 of FIG. 1. Specifically, a computing system that manages resources associated with one or more resource accounts may be configured to implement the method 300 as part of its processing of requests to share, distribute, or otherwise transfer resources between resource accounts. The method 300 may be performed by a computing system that manages one or both of a sender and a recipient account associated with a resource transfer request.

Operations starting with operation 302 and continuing onward may be performed, for example, by the processor 200 (FIG. 2A) of a computing device 105 executing software comprising instructions such as may be stored in the memory 210 of the computing device 105. For example, the operations of the method 300 may be performed by a resource account management system associated with a transferor entity, such as the resource server 130. More particularly, processor-executable instructions may, when executed, configure a processor 200 of the resource server 130 to perform all or parts of the method 300.

A computing system, such as a resource account management system, may receive a request to transfer resources associated with a resource account (or data records associated therewith). Specifically, in operation 302, the computing system receives a first request to initiate a first resource transfer for transferring a first defined quantity of resources from a sender data record to a recipient data record. The first request may be received, for example, via a client device associated with the sender data record (and/or sender resource account). The information for defining the first request, or first transfer parameters, may be inputted via the client device. In particular, a transferor entity for the first resource transfer may input the first transfer parameters directly using their device. The first transfer parameters may be inputted, for example, via a user interface, accessible on a transferor device, for generating requests to transfer resources. The first transfer parameters may include, at least, identifying information (e.g., name, email address, etc.) for a recipient, account information for a designated recipient account/data record for the first resource transfer, and a quantity of resources that is requested to be transferred via the first resource transfer. In some embodiments, the first transfer parameters may additionally indicate a desired time of initiating the first resource transfer, a type (e.g., real-time transfer, etc.) associated with the first resource transfer, and message content of a message associated with the first resource transfer.

In operation 304, the computing system determines that the first resource transfer is of a first type. In particular, upon receiving the first request (e.g., from a transferor entity), the computing system determines whether the requested first resource transfer is one of a set of predefined transfer types. In some embodiments, the first resource transfer may be determined to be of the first type if the computing system determines that there have not been any previous resource transfers from the sender data record to the recipient data record. For example, if the recipient data record is associated with a newly created resource account or an account with which no transfers have taken place from the sender account/data record, the computing system may determine that the first resource transfer is of the first type. Such determination may be made based on historical resource transfer (e.g., transactions) data associated with the sender data record. For example, the computing system may track and/or access historical resource transfer data identifying past transfer activities associated with the sender data record. If the historical resource transfer data for the sender data record does not include any indication of previous transfers to the recipient data record, the first resource transfer is of the first type.

In some embodiments, the first resource transfer may be determined to be of a first type if it is a real-time transfer. Specifically, if the first request is a request to transfer the first defined quantity of resources in real-time or substantially in real-time, the computing system may determine that the first resource transfer is of the first type. The computing system may, for example, obtain the first transfer parameters associated with the first resource transfer and determine, based on the first transfer parameters, whether the transfer of resources to the recipient data record is requested to be performed in real-time.

In response to determining that the first resource transfer is of the first type, the computing system proceeds to verify the recipient data record. That is, the computing system determines whether the recipient data record is to be verified based on a type associated with the first resource transfer. In particular, the verification of recipient identity (e.g., resource account, data record, etc. associated with the recipient) for an initial requested transfer of resources may be controlled based on the definition of types of transfers for which verification is required prior to initiating the initial requested transfer.

The computing system transmits, to a first server (or other computer system) associated with the recipient data record, a second request to initiate a second resource transfer for transferring a second defined quantity of resources from the recipient data record to the sender data record, in operation 306. Specifically, the second request is a request for a soliciting a resource transfer, or "transfer solicitation request". In at least some embodiments, the second request may be transmitted via a transfer rail, such as the real-time transfer rail 180 of FIG. 1.

A transfer solicitation request may be a specially formatted message that is sent from a first resource management system to a second resource management system. The transfer solicitation request may be sent from the first resource management system to the second resource management system via a transfer rail that is used for facilitating transfers between data records associated with different resource management systems. For example, the first resource management system may be associated with a first database and the second resource management system may be associated with a second database. The databases may store account data. That is, the databases may store data that is associated with various resource accounts. In at least some implementations, each record in the database may be associated with a particular one of these accounts.

A transfer solicitation request is a message that is sent on behalf of a recipient to cause a transfer to be initiated from a sender (i.e., a transferor entity) to the recipient. For example, the transfer solicitation request may be sent, on behalf of the recipient, from the resource management system associated with the recipient to the resource management system associated with the sender. The transfer solicitation request is a request to transfer from a record in the database that is associated with the sender to a record in the database that is associated with the recipient. The transfer solicitation request includes one or more identifiers that identify the record associated with the sender and/or the record associated with the recipient. The identifier(s) may be or include an account number. The transfer solicitation request may also include one or more identifiers that identify the resource management system associated with the sender and/or that identify the resource management system associated with the recipient. Such identifiers may be or include one or more of: a transit number and an institution number.

The transfer solicitation request comprises a transfer initiation message. That is, the transfer solicitation request is an initial message that may be used to cause a transfer to occur. Since the transfer solicitation request is initiated by a recipient rather than a sender, the transfer solicitation request may be considered a pull-style transfer, which may be contrasted with typical push-style transfers. In at least some implementations, the request to transfer may be formatted as an ISO20022 message.

The transfer solicitation request message is specially formatted to include parameters of a transfer that is requested to be made from a sender. The parameters may be included as metadata in the transfer solicitation request message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be electronic data. In some implementations, the resource may represent units of value, such as a quantity of a currency.

The parameters that are included in the transfer solicitation request may include data of another type. For example, in some implementations, the parameters may be or include transfer scheduling data. The transfer scheduling data may represent a time when the requested transfer is to be made. This time may be, for example, a due date or deadline for the transfer. The due date or deadline may represent a latest time at which the transfer is to be made.

The transfer solicitation request message may, in some implementations, be or represent a request for payment. Such a message may be referred to as a request-for-payment (RFP) message or a request-to-pay (RTP) message. In such implementations, the transfer rail may be a payment rail such as a real-time payment rail, and the resource management systems may be a financial institution system. The data records may, for example, represent bank accounts and a transfer may be a request to transfer value from an identified sender bank account to the recipient bank account. The transfer solicitation request message may be sent from a first financial institution system, which is associated with a first financial institution, to a second financial institution system, which is associated with a second financial institution.

The transfer solicitation request message may be a special transfer message which is not formatted as an email or short message service (SMS) message. Instead, it may be a computer-to-computer message that is formatted to be specially processed by the resource management system that receives it. In at least some implementations, the computer-to-computer message may be formatted according to the ISO20022 standard. For example, the resource management system that receives the transfer solicitation request message may be configured to execute a process for obtaining authorization to complete a transfer in response to receiving the transfer solicitation request. More particularly, the resource management systems may be configured to only permit authorized transfers. For example, in one implementation, the database may store account data for a plurality of accounts and the associated resource management system may only allow a transfer out of an account if the transfer is authorized by an authorization entity for that account, such as an account holder. Authorization may, for example, require authenticated approval using a credential such as one or more of: a username, password, biometric authentication data or other credential.

In one implementation, in response to receiving the transfer solicitation request message, a resource management system may identify an affected account using an identifier defined by the transfer solicitation request message. The resource management system may subsequently send an electronic notification to a client device associated with the identified account. The notification may be provided as an in-application notification or operating system level notification. The notification may, for example, include a selectable option to authorize the transfer. The notification may allow the transfer to be made without requiring input of parameters that are typically required when a transfer is initiated by the sender rather than the recipient. By way of example, one or more parameters that are included in the transfer solicitation request may be used to pre-stage or pre-populate parameters of the transfer so that the sender does not have to manually input such parameters. In some implementations, the resource definition data included in the transfer solicitation request may be used to allow the transfer to be made without having the sender define what is to be transferred. For example, where the transfer is a transfer of a computing resource or electronic data, the sender may perform, or cause to be performed, the transfer without having to input any information defining the computing resource or data involved. Additionally, or alternatively, where the transfer is a transfer of units of value, the amount of value defined in the transfer solicitation request message may be used so that the sender does not have to define the value requested to be transferred.

In some implementations, transfer scheduling data included in the transfer solicitation request message may be used to schedule the transfer without requiring the sender to define such a schedule. For example, where the transfer scheduling data includes indication of a due date or deadline, the resource management system associated with the sender may automatically define a time for a transfer based on the transfer scheduling data without requiring the sender to manually input such time information.

In this way, the sender may cause a resource management system that is associated with the sender's record in a database to perform, or cause to be performed, the transfer without having to input any parameters for the transfer. The time and/or amount of the transfer may be extracted directly from the transfer solicitation request message, and the sender may only need to input an indication of consent to cause the transfer to be initiated when the sender has authenticated to the resource management system. Additionally, or alternatively, in some implementations, the resource management system may process the transfer solicitation request by using the parameters defined in the transfer solicitation request as default parameters for a pre-staged transfer which can be overridden through input of alternative parameters by the sender.

In at least some embodiments, the second request (of operation 306) may be for soliciting transfer of a nominal quantity of resources associated with the recipient data record to the sender data record. For example, the second request may comprise a request-for-payment of a nominal amount from an account/data record of the recipient (as identified in the initial resource transfer request of operation 302) to an account/data record of the sender. In some embodiments, the request data of the second request may include additional information such as, for example, random nonce challenge data. That is, message data associated with the second request may include metadata defining one or more random nonce challenges. Additionally, or alternatively, the request data of the second request may include at least one indication that the second request is for verifying the recipient data record. For example, the request data may include a flag or other identifier indicating that the second request represents an authentication request-for-payment.

In operation 308, the computing system receives, from the first server, a response message associated with the second request that authorizes the second resource transfer. In particular, the response message comprises an indication of approval, provided by a recipient entity, of the second resource transfer for transferring the second quantity of resources from the recipient data record to the sender data record. The response message includes an indication that it is associated with the second request. That is, the response message may be formatted to reference the second request so that it is handled by the computing system as a direct response to the second request. The response message is transmitted to the computing system via a real-time transfer rail, such as a real-time payment rail.

Upon receiving the second request, the first server may determine that the second request is a transfer solicitation request for authentication, or verification of the recipient data record. For example, the first server may detect the presence of a flag or other identifier that indicates that the second request is for authentication. In response to making such a determination, the first server may be configured to specially handle the second request. In particular, the first server may be configured to prompt a recipient entity associated with the recipient data record for input of approval data in connection with the second request. As will be explained in greater detail below with reference to FIG. 5, a client device associated with a recipient entity may be used to present a prompt to the recipient entity to input an indication of approval for the second resource transfer. Upon receiving such input of approval data, the first server may generate and transmit the response message to the computing system. The response message thus represents an express authorization, given by the recipient entity, of the second resource transfer.

In at least some embodiments, the message data of the response message includes, at least, ownership certifying data associated with the recipient data record. The ownership certifying data may include account identifying information, such as an account number, the name of an account holder, etc. for the recipient data record. Additionally, the ownership certifying data may include other data such as, for example, a nonce challenge included in the second request, an indication of the first defined quantity (i.e., quantity of resources requested to be transferred in the initial resource transfer request) and/or the second defined quantity (i.e., quantity of resources requested to be transferred by the second request), and an indication of historical activity data associated with the recipient data record. In some embodiments, the ownership certifying data may also include account data associated with the recipient data record which may be conducive to evaluating a level of risk associated with the initial requested resource transfer. For example, the ownership certifying data may include a flag (or message metadata) for indicating whether the recipient data record was recently created or opened.

In operation 310, the computing system verifies the recipient data record based on the response message. Specifically, the computing system verifies that the information contained in the response message is accurate. For example, the computing system may validate ownership certifying data that is included in the response message by checking for accuracy of the data. The ownership certifying data may be validated by comparing the ownership certifying data (e.g., recipient account information, etc.) to stored information about the recipient data record that is accessible to the computing system. That is, the computing system is configured to verify that the information provided in the response message matches the information about the recipient data record that is available to the computing system and/or transferor of the initial requested resource transfer.

After verifying the recipient data record, the computing system initiates a third resource transfer for transferring a third defined quantity of resources from the sender data record, in operation 312. The third resource transfer may be directed to an account specified in the account ownership certifying data included in the response message or an account to which the second request was sent. The third resource transfer represents a combination of the initial requested resource transfer (i.e., first resource transfer) and a compensating transfer associated with the transfer solicitation request (i.e., second resource transfer) for authentication. In particular, the third defined quantity associated with the third resource transfer is equal to a sum of the first defined quantity and the second defined quantity.

The mechanism of method 300 (and described throughout the present disclosure) for verifying, or authenticating, a recipient data record by using a transfer solicitation request (i.e., a request soliciting transfer of a defined quantity of resources from the recipient data record) enables a computing system associated with the sender of the initial requested resource transfer to securely process various types of transfers (e.g., real-time transfers). In particular, the method 300 leverages use of a transfer rail (i.e., real-time transfer rail) for (1) transmitting information, including ownership certifying data, between resource management systems for verifying an identity of an intended recipient of a resource transfer, and (2) effecting an initial requested real-time transfer of resources from the sender. The disclosed methods allow for verifying ownership of an intended recipient account/data record prior to initiating, or causing to be initiated, an initial requested resource transfer.

Figure 4:
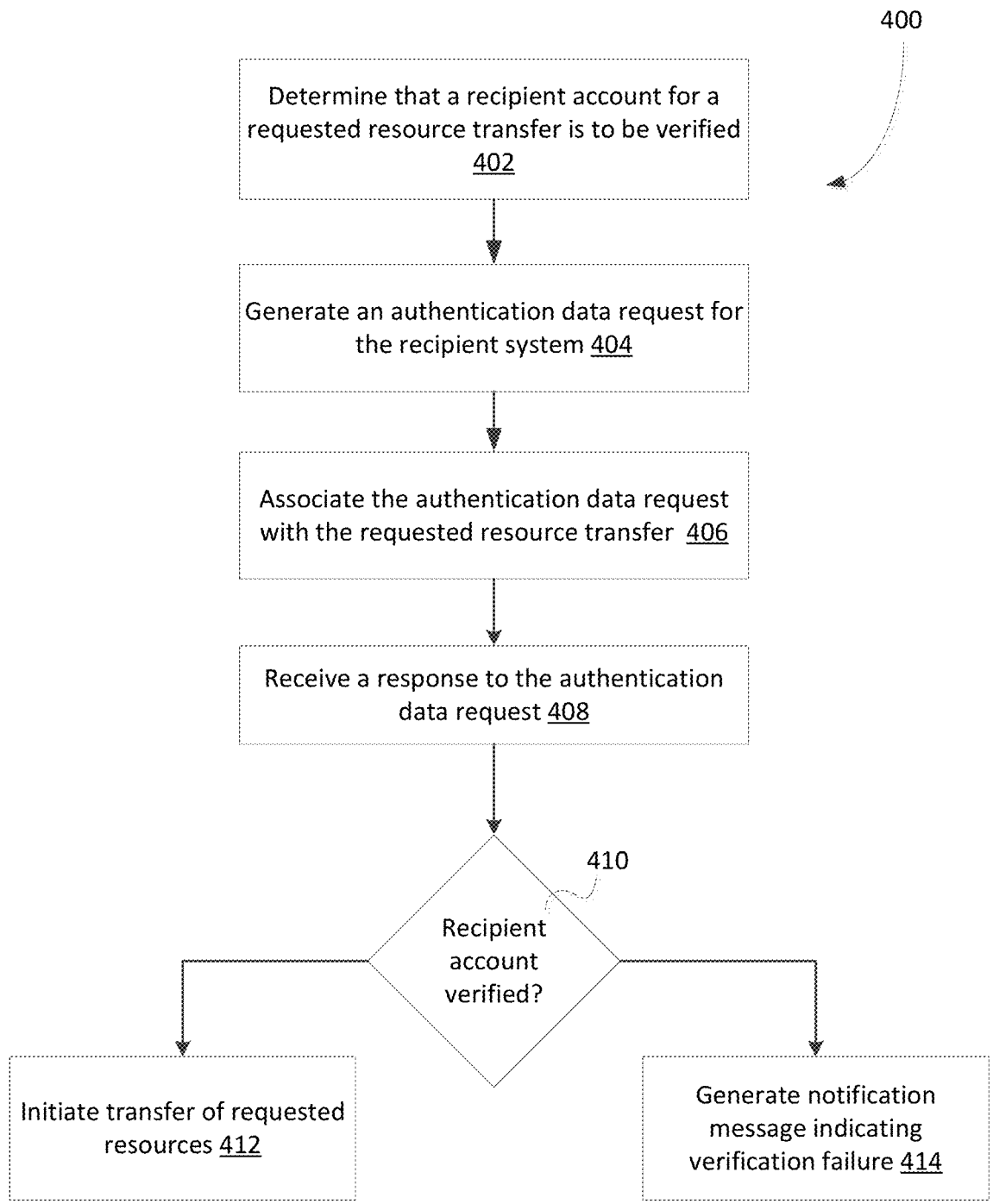
FIG. 4 shows, in flowchart form, another example method of processing a request for a real-time transfer of resources associated with a data record.

Reference is made to FIG. 4 which shows, in flowchart form, another example method 400 of processing a request for a real-time transfer of resources associated with a data record. The method 400 may be implemented by a resource management system. Specifically, a computing system that manages a resource account/data record associated with a transferor for a resource transfer may be configured to implement the method 400. The operations of method 400 may be performed, for example, by the processor 200 (FIG. 2A) of a computing device 105 executing software comprising instructions such as may be stored in the memory 210 of the computing device 105. For example, processor-executable instructions may, when executed, configure a processor 200 associated with a resource account management system (such as the resource server 130) to perform all or parts of method 400. The operations of method 400 may be performed in addition to, or as alternatives, to one or more of the operations of method 300 of FIG. 3.

In operation 402, a computing system determines that a recipient account for a requested resource transfer is to be verified. The resource transfer may be of a defined type (e.g., a real-time payment transfer, a transfer to a newly created account, etc.). The computing system may be configured such that upon determining that the resource transfer is of the defined type, the computing system identifies a recipient account associated with the resource transfer and determines that said recipient account is required to be verified. Specifically, the computing system may cause ownership of the recipient account to be verified; that is, a check may be performed to verify that the recipient account identified in the requested resource transfer (e.g., by transfer parameters of the requested transfer) is owned by the intended recipient entity.

In operation 404, the computing system generates an authentication data request for the recipient system. The authentication data request is a request for information which may be used for verifying account ownership of the recipient account that is identified in the requested resource transfer. In at least some embodiments, the authentication data request may comprise a transfer solicitation request, such as the "second request" described with reference to method 300 of FIG. 3. For example, a response to the authentication data request may be a response message authorizing a transfer of resources from the recipient account to the sender account. The response may contain, for example, account ownership certifying data which may be cross-referenced with stored information about the intended recipient to verify ownership of the recipient account.

More generally, the authentication data request may specify certain required information for verifying account ownership of the recipient account. The authentication data request may be transmitted to a server (or other computer system) associated with a recipient identified in the requested resource transfer. The server may, for example, be a resource account management server that manages the recipient account. The server may process the authentication data request and obtain requisite information for generating a suitable response to the authentication data request. The authentication data request may be generated only in connection with resource transfers that are of a defined type. In particular, the computing system may not generate an authentication data request for requested transfers that are not of one or more defined transfer types.

In operation 406, the computing system associates the authentication data request with the requested resource transfer. For example, the computing system may store information for the authentication data request in association with transfer parameters of the requested resource transfer. Additionally, or alternatively, the request data for the authentication data request may include an identifier (e.g., a flag, etc.) that indicates that the authentication data request is associated with a particular transfer for transferring a defined quantity of resources to the recipient account.

In operation 408, the computing system receives a response to the authentication data request. The response may, for example, be formatted as a message containing at least some of the information that is identified as being required in the authentication data request. For example, the response message may include certain account ownership certifying data (e.g., account number, name of account holder, etc.) associated with the recipient account. In some embodiments, the authentication data request may be transmitted via a transfer rail, such as a real-time payment rail, to the server associated with the recipient account, and the response message may be transmitted via the same transfer rail.

The computing system determines whether the recipient account, as identified in the requested resource transfer, is verified, in operation 410. In particular, the computing system verifies whether the recipient account is owned by the intended recipient for the transfer. The recipient account may be verified, for example, by verifying the accuracy of the account ownership certifying data provided as part of the response to the authentication data request. That is, the computing system may perform comparison between the ownership certifying data and stored information associated with the intended recipient.

If the computing system determines that the recipient account is verified (i.e., the account is owned by the intended recipient), the computing system initiates, or causes to be initiated, the initial requested transfer of resources, in operation 412. On the other hand, if the recipient account is not successfully verified, the computing system generates a notification message indicating verification failure, in operation 414. By way of example, if one or more of the account ownership certifying data items does not match stored information about the intended recipient, the computing system may determine that the recipient account identified in the resource transfer request is not verified (e.g., the recipient account is incorrectly identified, the intended recipient does not own the recipient account, etc.). The notification message may be presented via a user interface accessible on a device of the sender entity. For example, the notification message may be provided on a user interface of an application, such as a resource account management application, a mobile banking application, etc., for configuring transfers (e.g., fund transfers) from an account of the sender.

Figure 5:
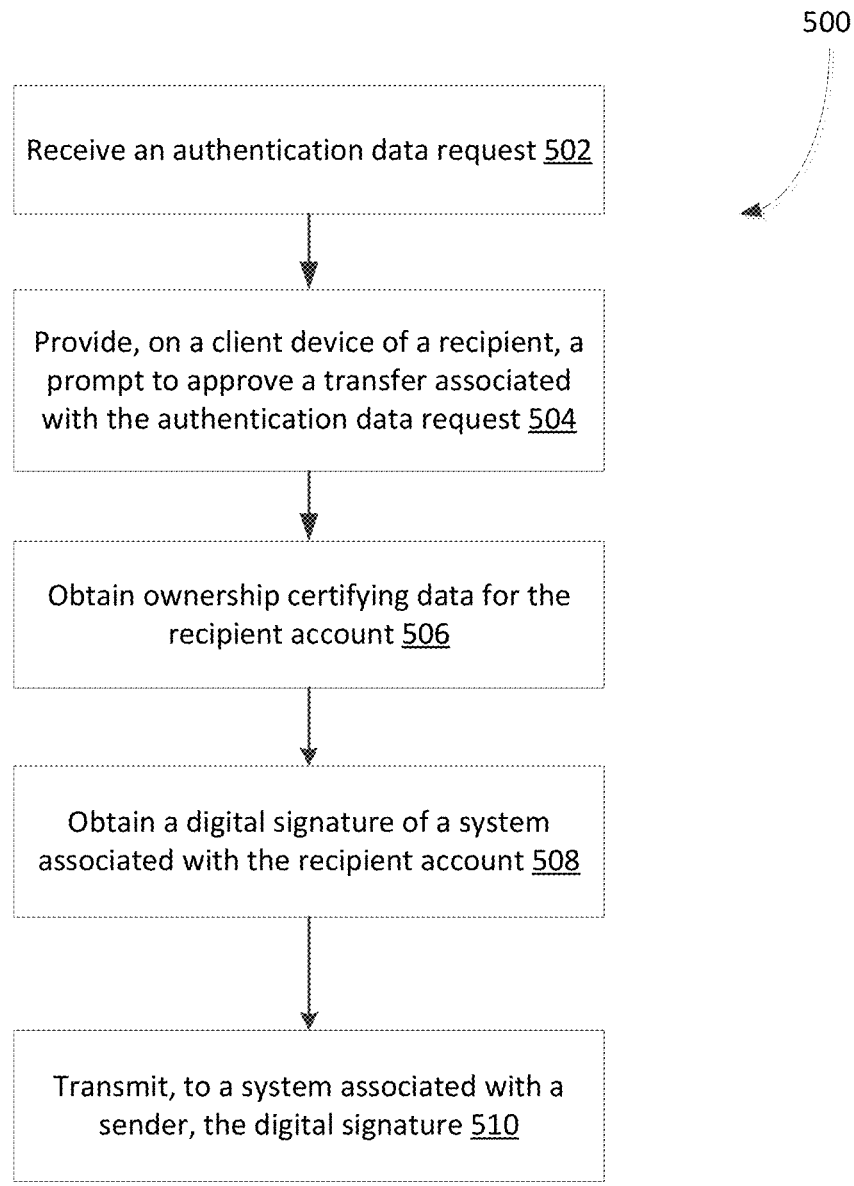
FIG. 5 shows, in flowchart form, an example method of processing an authentication data request associated with a real-time transfer of resources.

Reference is now made to FIG. 5, which shows, in flowchart form, an example method 500 of processing an authentication data request associated with a real-time transfer of resources. The method 500 may be implemented by a resource management system. Specifically, a computing system that manages a resource account/data record associated with an identified recipient of a requested resource transfer may implement the method 500. The operations of method 500 may be performed, for example, by the processor 200 (FIG. 2A) of a computing device 105 executing software comprising instructions such as may be stored in the memory 210 of the computing device 105. For example, processor-executable instructions may, when executed, configure a processor 200 of a resource account management system (such as the resource server 140) to perform all or parts of method 500.

In operation 502, a computing system associated with an identified recipient of a requested resource transfer receives an authentication data request. The resource transfer may be a transfer that is requested by an entity associated with a sender account. The computing system may, for example, be a server of a resource account management system that manages the recipient account identified in the resource transfer (e.g., transfer parameters of the requested transfer). The authentication data request represents a request by a system associated with the sender to obtain information for verifying ownership of the identified recipient account.

In operation 504, the computing system provides, on a client device associated with the recipient account, a prompt to approve a transfer associated with the authentication data request. The prompt may, for example, be in the form of a notification that is accessible on the client device (e.g., an app notification). The user of the client device may be prompted to either approve or reject a transfer. The transfer may be a transfer of resources or electronic data. For example, the transfer may be a payment of a defined nominal amount from the recipient account to the sender account. As another example, the transfer may comprise transmission of certain account ownership certifying data that is provided by the user of the client device.

When the recipient provides the requested approval data for the transfer in connection with the authentication data request, the computing system obtains account ownership certifying data for the recipient account, in operation 506. As explained above, the account ownership certifying data may include one or more of: identifying information (e.g., account number, name of account holder, etc.) for the recipient account; a nonce challenge included in the authentication data request; an indication of a quantity of resources associated with the initial requested transfer; or an indication of historical activity data associated with the recipient account.

In operation 508, the computing system obtains a digital signature. The digital signature may, for example, be a signature that is associated with the computing system (or resource account management entity) managing the recipient account. The digital signature may be generated by combining a message (i.e., response message) containing account ownership certifying data for the recipient account with a private key associated with the recipient computing system/resource account management entity. That is, the ownership certifying data is signed by the recipient computing system. Anyone with a corresponding public key can verify the authenticity of the message contents, namely, the ownership certifying data contained in the message.

In operation 510, the computing system transmits, to a system associated with a transferor of the requested resource transfer, the digitally signed message.

Figure 6:
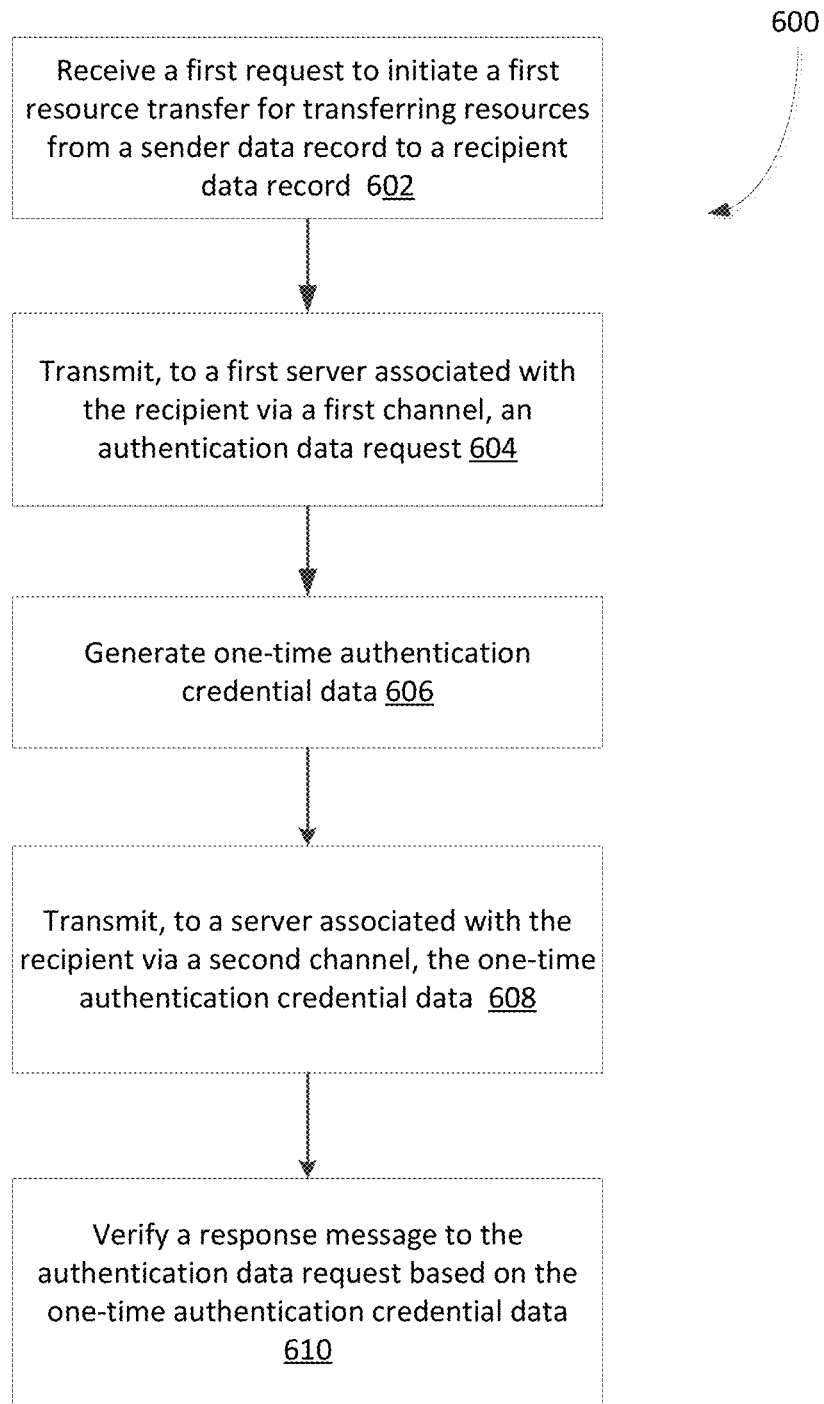
FIG. 6 shows, in flowchart form, an example method of verifying account ownership certifying data.

FIG. 6 shows, in flowchart form, an example method 600 of verifying account ownership certifying data. The method 600 may be implemented by a resource management system, such as the resource server 130 of FIG. 1. Specifically, a computing system that manages resources associated with one or more resource accounts may be configured to implement the method 600 as part of its processing of requests to share, distribute, or otherwise transfer resources between resource accounts. The method 600 may be performed by a computing system that manages one or both of a sender and a recipient account associated with a resource transfer request. The operations of method 600 may be performed in addition to, or as alternatives of, one or more of the operations of methods 300 and 400.

In operation 602, a computing system receives a first request to initiate a first resource transfer for transferring resources from a sender data record to a recipient data record. The first resource transfer is requested by a sender entity, and the first request identified a recipient data record for the requested transfer.

In operation 604, the computing system transmits, to a first server (or other computer system) associated with the identified recipient of the requested resource transfer via a first channel, an authentication data request. The authentication data request represents a request for information that may be used for verifying ownership of the recipient account. Specifically, the authentication data request is a request to obtain information that enables the computing system to determine whether the recipient account identified in the first request is owned by the intended recipient of the resource transfer.

In operation 606, the computing system generates one-time authentication credential data. For example, a one-time password, such as a code, may be generated by the computing system. The code may, in some embodiments, be a unique alphanumeric code. The computing system transmits, to the first server via a second channel, the one-time authentication credential data, in operation 608. That is, the code (or other one-time password) may be provided to the first server via a channel that is different from the channel that is used for transmitting the authentication data request. In some embodiments, the one-time password may be obtained by the first server via a third-party source (and not the sender computing system). For example, the first server may obtain a unique one-time password via a website by inputting recipient information (which must match a name of an intended recipient identified by the sender for successful authentication).

In operation 610, the computing system verifies the response message to the authentication data request based on the one-time authentication credential data. In particular, the computing system may determine that a one-time password (e.g., code) is included in the response message and the password may be verified as being correct or incorrect.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor;
and
a memory coupled to the processor, the memory storing computer-executable instructions that, when executed, configure the processor to:
receive a first request to initiate a first resource transfer for transferring a first defined quantity of resources from a transferor data record to a transferee data record;
determine that the first resource transfer is of a first type;
in response to determining that the first resource transfer is of the first type, verify that the transferee data record is associated with an intended recipient of the first resource transfer by:
transmitting, to a first server associated with the transferee data record, a transfer solicitation request for requesting a second resource transfer of a second defined quantity of resources to be initiated from the transferee data record to the transferor data record;
receiving, from the first server, a response message authorizing the second resource transfer, the response message including an indication of approval of the second resource transfer by the intended recipient and including ownership information for the transferee data record; and
verifying ownership of the transferee data record based on the response message, and
after verifying that the transferee data record is associated with the intended recipient, initiate a third resource transfer for transferring a third defined quantity from the transferor data record to the transferee data record.

2. The computing system of claim 1, wherein determining that the first resource transfer is of a first type comprises determining that there have not been any previous resource transfers from the transferor data record to the transferee data record.

3. The computing system of claim 1, wherein determining that the first resource transfer is of a first type comprises determining that the first defined quantity of resources is requested to be transferred in real-time or substantially in real-time.

4. The computing system of claim 1, wherein request data of the transfer solicitation request includes an indication that the transfer solicitation request is for verifying the transferee data record.

5. The computing system of claim 1, wherein message data of the response message includes ownership certifying data associated with the transferee data record and wherein verifying ownership of the transferee data record based on the response message comprises validating the ownership certifying data.

6. The computing system of claim 5, wherein the ownership certifying data includes at least one of: an account identifier associated with the transferee data record; a nonce challenge included in the transfer solicitation request; an indication of the first defined quantity or the second defined quantity; or an indication of historical activity data associated with the transferee data record.

7. The computing system of claim 5, wherein the instructions, when executed, further configure the processor to generate a first code and wherein verifying ownership of the transferee data record based on the response message comprises confirming that the first code is included in the message data of the response message.

8. The computing system of claim 5, wherein validating the ownership certifying data comprises:
obtaining transferee information associated with an intended transferee of the first resource transfer; and
performing comparison between the ownership certifying data and the transferee information.

9. The computing system of claim 1, wherein the third defined quantity is equal to a sum of the first defined quantity and the second defined quantity.

10. The computing system of claim 1, wherein message data of the response message is digitally signed using a private key associated with the first server.

11. A computer-implemented method, comprising:
receiving a first request to initiate a first resource transfer for transferring a first defined quantity of resources from a transferor data record to a transferee data record;
determining that the first resource transfer is of a first type;
in response to determining that the first resource transfer is of the first type, verifying that the transferee data record is associated with an intended recipient of the first resource transfer by:
transmitting, to a first server associated with the transferee data record, a transfer solicitation request for requesting a second resource transfer of a second defined quantity of resources to be initiated from the transferee data record to the transferor data record;
receiving, from the first server, a response message authorizing the second resource transfer, the response message including an indication of approval of the second resource transfer by the intended recipient and including ownership information for the transferee data record; and
verifying ownership of the transferee data record based on the response message, and
after verifying that the transferee data record is associated with the intended recipient, initiating a third resource transfer for transferring a third defined quantity from the transferor data record to the transferee data record.

12. The method of claim 11, wherein determining that the first resource transfer is of a first type comprises determining that there have not been any previous resource transfers from the transferor data record to the transferee data record.

13. The method of claim 11, wherein determining that the first resource transfer is of a first type comprises determining that the first defined quantity of resources is requested to be transferred in real-time or substantially in real-time.

14. The method of claim 11, wherein request data of the transfer solicitation request includes an indication that the transfer solicitation request is for verifying the transferee data record.

15. The method of claim 11, wherein message data of the response message includes ownership certifying data associated with the transferee data record and wherein verifying ownership of the transferee data record based on the response message comprises validating the ownership certifying data.

16. The method of claim 15, wherein the ownership certifying data includes at least one of: an account identifier associated with the transferee data record; a nonce challenge included in the transfer solicitation request; an indication of the first defined quantity or the second defined quantity; or an indication of historical activity data associated with the transferee data record.

17. The method of claim 15, further comprising generating a first code and wherein verifying ownership of the transferee data record based on the response message comprises confirming that the first code is included in the message data of the response message.

18. The method of claim 15, wherein validating the ownership certifying data comprises:
   obtaining transferee information associated with an intended transferee of the first resource transfer; and
   performing comparison between the ownership certifying data and the transferee information.

19. The method of claim 11, wherein the third defined quantity is equal to a sum of the first defined quantity and the second defined quantity.

20. The method of claim 11, wherein message data of the response message is digitally signed using a private key associated with the first server.

* * * * *